United States Patent
Miskell et al.

(10) Patent No.: US 7,650,785 B1
(45) Date of Patent: Jan. 26, 2010

(54) SCAN LOCK AND TRACK FLUID CHARACTERIZATION AND LEVEL SENSOR APPARATUS AND METHOD

(75) Inventors: Thomas Miskell, Merrimack, NH (US); Vincent J. Rizzo, Hollis, NH (US)

(73) Assignee: Vibro-Meter, Inc., Merrimack, NH (US)

( * ) Notice: Subject to any disclaimer, the term of this patent is extended or adjusted under 35 U.S.C. 154(b) by 181 days.

(21) Appl. No.: 11/650,841

(22) Filed: Jan. 8, 2007

Related U.S. Application Data

(60) Provisional application No. 60/859,756, filed on Nov. 17, 2006.

(51) Int. Cl.
*G01F 23/00* (2006.01)
(52) U.S. Cl. .................. 73/290 R; 73/290 V; 73/340 R
(58) Field of Classification Search ............... 73/304 R, 73/290 R, 290 V
See application file for complete search history.

(56) References Cited

U.S. PATENT DOCUMENTS

| | | | | |
|---|---|---|---|---|
| 3,824,597 A * | 7/1974 | Berg | .......................... | 370/215 |
| 6,640,629 B2 * | 11/2003 | Carsella et al. | ........... | 73/290 R |
| 6,644,114 B1 * | 11/2003 | McEwan | .................. | 73/290 R |
| 6,690,320 B2 * | 2/2004 | Benway et al. | .............. | 342/124 |
| 6,867,729 B2 * | 3/2005 | Berry et al. | ................. | 342/124 |
| 7,446,695 B2 * | 11/2008 | McEwan | ..................... | 342/21 |

* cited by examiner

*Primary Examiner*—Hezron Williams
*Assistant Examiner*—Rodney T Frank
(74) *Attorney, Agent, or Firm*—Sheehan Phinney Bass & Green P.A.; Peter A. Nieves

(57) ABSTRACT

A liquid characterization and level sensor with a coaxial probe attached to a closed loop servo circuitry combined with a DSP and novel algorithms to scan, lock and track signals to ascertain the level and purity of fluid in a container.

28 Claims, 8 Drawing Sheets

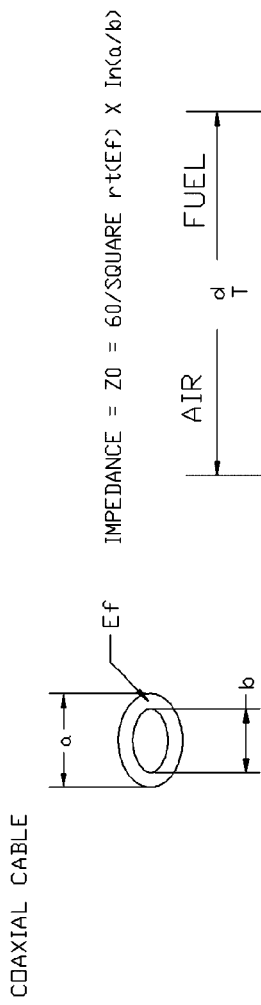
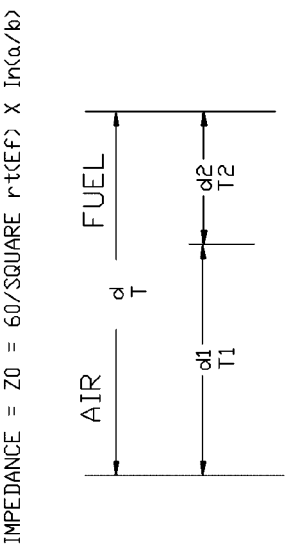
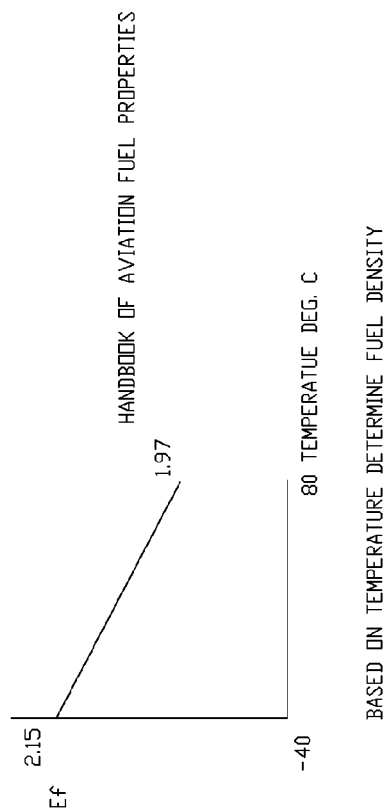

COAXIAL CABLE

IMPEDANCE = $Z_0$ = 60/SQUARE rt($e_f$) X ln(a/b)

- d = TOTAL DEPTH OF TANK (FIXED INCHES)
- d1 = DEPTH OF AIR (INCHES)
- d2 = DEPTH OF FUEL (INCHES)
- T1 = PROPAGATION TIME IN AIR (SEC)
- T2 = PROPAGATION TIME IN FUEL (SEC)
- Va = PROPAGATION VELOCITY IN AIR (FIXED IN/SEC)
- Vf = PROPAGATION VELOCITY IN FUEL (IN/SEC)
- Ef = DIELECTRIC CONSTANT IN FUEL
- Ef = (10^12/85Vf)^2 (COAXIAL CABLE)
- Df = FUEL DENSITY (KG/M^3)

MEASURE T1 PROPAGATION TIME IN AIR FIXED INDEPENDENT OF TEMPERATURE
CALCULATE d1=Va X T1 (Va = 1.1810^10 IN/SEC)
CALCULATE d2 = d-d1
MEASURE T TOTAL PROPAGATION TIME TO END OF TANK
CALCULATE T2 = T-T1
CALCULATE Vf = d2/T2

CALCULATE Ef = (10^12/85Vf)^2      HIGH SPEED DIGITAL DESIGN
                                    BY HOWARD W. JOHNSON & MARTIN GRAHAM

DETERMINE TEMPERATURE FROM TABLES

HANDBOOK OF AVIATION FUEL PROPERTIES

BASED ON TEMPERATURE DETERMINE FUEL DENSITY

FIG. 4A

SCAN LOCK AND TRACK FLUID CHARACTERIZATION AND LEVEL SENSOR APPARATUS AND METHOD

CROSS-REFERENCE TO RELATED APPLICATION

A claim of benefit is made to U.S. Provisional Application Ser. No. 60/859,756 filed Nov. 17, 2006, the contents of which are incorporated by reference in their entirety.

FIELD OF THE INVENTION

This invention relates to methods and apparatus to detect liquid levels in containers.

BACKGROUND OF THE INVENTION

Detecting fluid levels is important for a variety of reasons. Marine and aviation applications require accurate measurements of fuel to ensure sufficient supplies to reach intended destinations. Aviation applications are exceptionally important to monitor the fuel levels in multiple tanks to ensure proper balance of levels to impart the least impact on a plane's aerodynamics, which can be significantly affected by changes in a plane's three-dimensional center of gravity.

Another important measurement function is to ascertain the presence of, and amount of, any contaminants in fuel to ensure the safe and proper operation of engines operated with the fuel. Entry of contaminants into an operating engine can lead to severe performance problems and even engine failure. A means to constantly monitor the presence and amount of contaminants, particularly water, is an essential component of any fuel measurement system.

An accurate, reliable and safe method of measuring the amount of liquid in a container is essential. Applications include fuel tanks containing volatile liquids, although the invention described herein can accommodate a wide range of liquids, regardless of their volatility characteristics. Other parameters that must be ascertained with accuracy and consistency are the type of fuel and the contamination content, if any. A further consideration is a need for hardware that meets the EMI, ESD and Interface requirements of a container, such as an aviation fuel tank, in its environment in a safe manner.

Prior radar technology includes methods to scan, lock on and track targets. The basic approach is to transmit a signal that scans targets, perform gating on a receiver and select targets to lock onto and track. Analysis of the received signal can then be used to determine the distance (range) of the target and to perform signature recognition to define the type of target and its characteristics. Combining radar technology with transmission line theory through a shielded cable solves the problems attendant with sensing liquid levels in containers, particularly those used in the aviation field.

SUMMARY OF THE INVENTION

In one aspect of the invention, a coaxial probe (tube) is connected to a power source and circuitry designed to provide time domain reflectometric readings to determine the level of, and presence of, impurities in a liquid. Also called Micropower Impulse radar, the system involves sending a very low microwave pulse along a wave-guide, a probe. At least part of the pulse is reflected at the fluid being measured. The transmitted and reflected pulse times are measured and used as the basis for calculating the fluid's level in a container.

In another aspect of the invention, the coaxial probe connected to the circuitry enables the apparatus to meet all aircraft intrinsic safety requirements such as low electromagnetic interference sensitivity. The apparatus works exceptionally well in a very noisy environment while creating very little noise out. By using a coaxial probe, the apparatus is hermetically sealed and requires very low voltage to operate.

In a further aspect of the invention, a closed loop configuration is used to scan, track and lock onto transmitted and reflected pulses. The propagation speed of the microwave pulse through a material can be used to ascertain the identity of the material through which the pulse is traveling. The propagation speed is directly related to the material's dielectric constant. Materials with different dielectric constants will result in different propagation speeds. Thus, the apparatus can be used to measure fluid and/or gas contamination. The transit time of the pulse is used to measure the dielectric constant also known as the material's relative permittivity.

A further aspect of the invention is to employ a digital signal processor (DSP) to substantially reduce signal-to-noise ratio and improve signal clarity with a novel algorithm to scan, lock and track fluid levels in a container.

These and other objects will be apparent from a reading of the following summary and detailed description along with a review of the appended drawings.

BRIEF DESCRIPTION OF THE DRAWINGS

FIG. 4a is a flow chart of the calculations made to convert reflected signals into measurements of height, weight and temperature of a monitored fluid according to one embodiment of the invention.

DETAILED DESCRIPTION OF THE INVENTION

Figure 1:
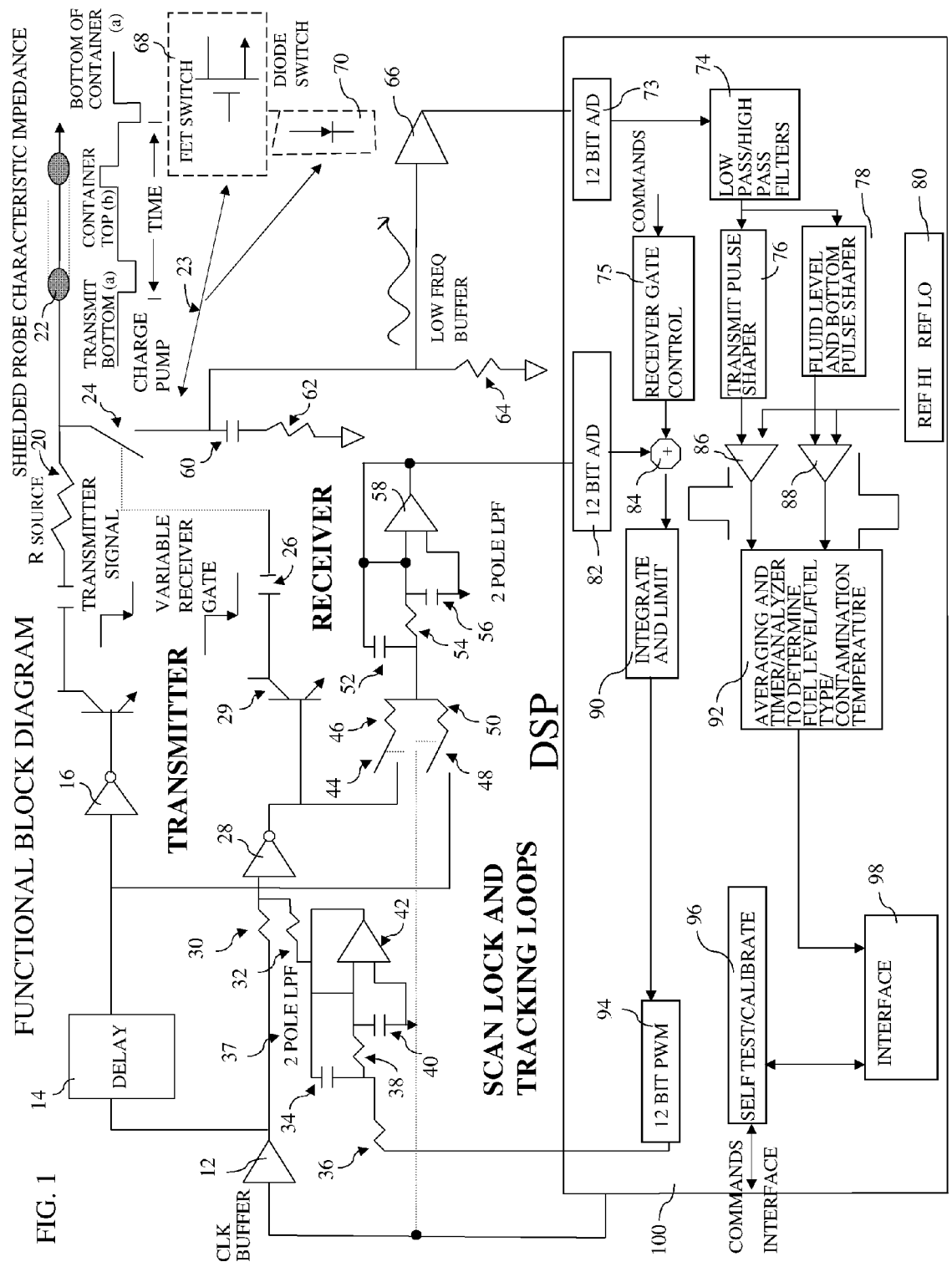
FIG. 1 is a schematic diagram of the circuitry according to one embodiment of the invention.

Referring to FIG. 1, in one aspect of the invention, the diagram illustrates the basic implementation of the analog transmit and receive channels. A digital signal processor (DSP) used to close the scan, lock and track loops and analyze the data is shown. The DSP is particularly beneficial in this application as it provides a superior signal-to-noise ratio and enhanced fidelity or image clarity, provides very accurate crystal-based timing and is independent of temperature variations as compared to prior art analog circuitry. More specifically, with respect to the transmitter component of the invention, a square wave pulse from about 1 to about 3 MHz is generated by a clock in the DSP and is buffered by passing through amplifier 12. The transmission pulse is delayed by delay 14 to synchronize the transmitter and receiver. Delay 14 may be analog or digital and fixes the leading edge of the transmit signal with respect to the receiver being gated.

The output of delay 14 is inverted at a high speed digital logic gate (inverting amplifier) 16, the output of which is buffered by high speed transistor 17. Transistor 17 acts as a switch that turns on when a positive or relatively high voltage, e.g., 3.3 volts, is received and turns off when the voltage is low or ground. In one embodiment, inverter 14 puts out either ground or 3+ volts. The output of transistor 17 is converted to a pulse by a capacitor 18 that functions as an open circuit for the slow speed signal or rising edge of the pulse wave, and as a short circuit for the high speed signal or falling edge. In this manner, capacitor 18 prevents passage of the low speed signal.

Capacitor 18 drives the shielded probe which forms a transmission line driven from the source impedance R7. The high speed edge continues along the transmit line into a probe 22, which in one embodiment is shielded, where the source, characteristic and load impedances are optimized to produce large, clearly delineated reflections of various points in a fuel container such as the container bottom (a) and container top (b).

The propagation time of the wave forms or reflections are directly dependent on the dielectric constant of the material being traversed. For example, the propagation time through air will be faster than through fuel because of the differences between the dielectric constants of air and fuel. Additionally, the propagation time will be affected by the amount of fuel or other fluid in the container. A higher fuel content will lead to a slower return pulse.

The depth and type of liquid and size of the container dictate the minimum propagation time and what frequency should be used for the transmitter and receiver rates. The frequency must allow time for the propagation of the transmit signal to the bottom of the container and return to the receiver. In one embodiment, the maximum frequency is used thus allowing integration of the maximum number of returns for good signal to noise ratio. The 1-3 MHz transmit cycle is constantly repeated in a substantially constant manner.

Turning to the receiver, the clock output is low pass filtered via resistor 30 and added to the dc signal from amplifier 42 so that the combined signal sets the threshold for comparator 28. The amplifier output is inverted similar to the inversion performed by inverter 16 except without the preceding delay. The output is buffered by high speed transistor 29 and converted to a pulse by capacitor 26 that couples the high speed falling edge of the waveform to turn a switch 24 on and off. Switch 24 may be implemented by either a Fet switch 68 or a diode switch 70. The result is a receiver gate signal synchronized to the transmit pulse but shifted in time depending on the dc signal from amplifier 42.

Once switch 24 is closed, voltage sampling begins at probe 22. A charge pump 23 is incorporated into the system to follow the transmitted and reflected signals. The sampling switch is closed for relatively short periods of time (<1 nanosecond) and shifted in picoseconds over about a 200 to about a 500 ms cycle depending on the length of the tube and reflection times. Multiple samples are measured at almost the same time spot to insure a high signal to noise ratio. The charge pump includes a capacitor 60 and a resistor 62. Whether the charge pump is charged is dependent on the voltage of the received reflections. If positive voltages are received, the pump is charged.

By sampling multiple times at the same spot, the relatively high frequency reflection is converted to a low frequency dc voltage signal that accommodates the limitations of the DSP. By reducing the frequency, rather than having to take measurements in nanoseconds or picoseconds, measurements can be made in milliseconds.

With this configuration, sampling can be conducted in the same spot relative to the transmit pulse for a relatively long period of time by being shifted (at a picoseconds rate) each time the switch is turned on over this incrementally increasing time differential. Sampling at other spots is accomplished by incrementally increasing the time gap between adjacent switch operation events. DSP 72 initiates the process of setting the time gaps.

An initial command is sent by receiver gate 75 to an amplifier 42 via an integrate and limit algorithm 90 and a 12 bit pulse width modulator (PWM) 94. The dc voltage passes to resistor 36 and a 2 pole low pass filter 37 that includes capacitors 34 and 40 and resistor 38. The voltage is then buffered by amplifier 42. The output voltage of amplifier 42 passes to a resistor 32 and is summed with the output of resistor 30, the sum of which passes to comparator 28. The first command sent results in the initial voltage into resistor 32 being 0 so that there is no time delay effect on the initial signal to switch 24.

The output of comparator 28, which is inverted, passes to switch 44 and resistor 46. Simultaneously with the exception of the delay produced by delay 14, the transmit line pulse travels to switch 48 and resistor 50. The outputs from resistors 46 and 48 are summed and pass through a 2 pole low pass filter 55 that includes capacitors 52 and 56 and resistor 54. The filtered dc signal is amplified by amplifier 58 and enters DSP 72 via a 12 bit a/d converter. The digitized signal is summed with the command from receiver gate control 75 and processed by the integrate and limit algorithm 90.

Figure 2:
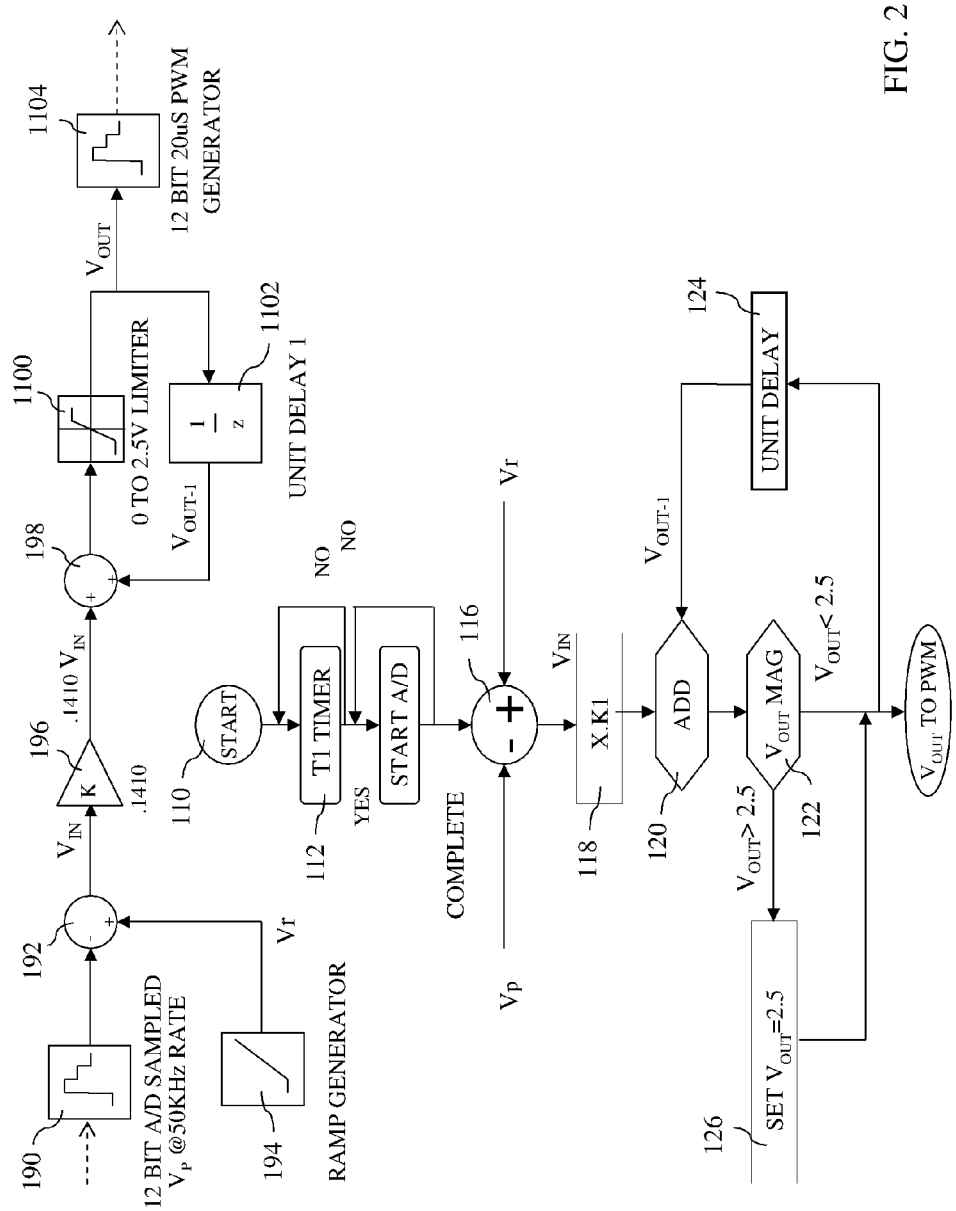
FIG. 2 is a block diagram and flowchart of the DSP integrate and limit algorithms according to one embodiment of the invention.

Referring now to FIG. 2, with respect to the DSP operation and algorithms, the amplifier 58 dc output represents the time between when the transmit pulse begins and the receiver gate is started. This time is compared to the time commanded by receiver gate control 75. The difference forms the error signal for the scan, lock and track loops. The error is input into the loop compensation (sets the loop bandwidth) shown in FIG. 2.

The signal processing begins at start 110. A timer 112 controls the operation. If the timer is ready, the a/d conversion begins at 114. If not, the system loops back and tries again until timer 112 is ready. Once the a/d conversion is complete, the signal from amplifier 58 (represented as $v_p$) is put through a summation step 116 with the voltage command signal from receiver gate control 75 (represented as $v_r$). The result $V_{in}$ is multiplied by a constant at step 118 and added at step 120 to the immediately preceding voltage output Vout-1 to produce Vout. The magnitude of the resulting Vout is checked at step 122 to determine its magnitude. If the magnitude is greater than a preselected limit, the Vout is set to the selected limit at step 126. If the Vout is less than the selected limit, is passes to the PWM 94. Vout also loops back and is delayed at step 124 to be added to the next $V_{in}$.

The output of algorithm 90 is used to set the width of the PWM 94 DSP output and controls the time the receiver gate is started (opened) and ended (closed). The loop will drive the error to zero and thus track any or all return propagation times from the transmit time to the bottom of the container. In one illustrative embodiment, in scan mode, the receiver gate controller 75 output begins at zero time (transmit) and increases until the fluid level and the bottom of the tank/container are detected. Once these times are known, the mode can be commanded to change to lock and track the propagation time (distance) with respect to a) the top of the fuel level, b) through the fluid between the top of the fluid and the bottom of the tank, and c) the bottom of the container only.

Referring again to FIG. 1, the low frequency signals are buffered by amplifier 66 and input to the DSP 72 and into a 12 bit a/d converter 73. The amount of filtering and amplification can be varied as is known in the art to optimize the tracking analysis. Once the signal is digitized, it is processed through a low pass/high pass filter to shape the signal and remove any noise.

Figure 3:
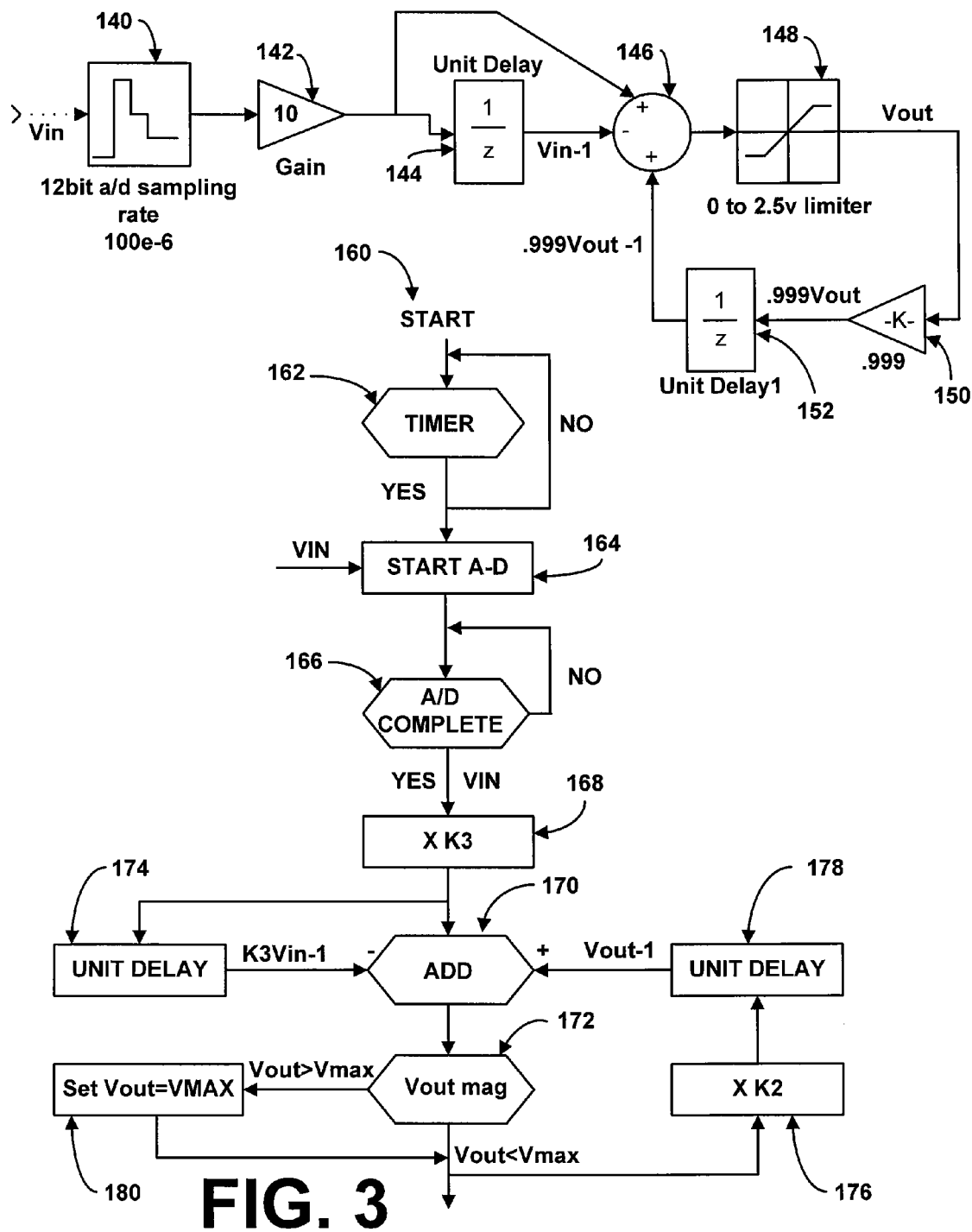
FIG. 3 is a block diagram and flowchart of DSP algorithms using a low pass/high pass filter according to another embodiment of the invention.

Referring to FIG. 3, the filter process begins at start 160. A timer 162 controls the operation. If the timer is ready, the a/d conversion begins at 164. If not, the system loops back and tries again until timer 162 is ready. After the conversion, a check is made as to whether the a/d conversion is complete at step 166. If not, the system loops back and continues the conversion. Once the conversion is complete, the digitized signal represented as Vin is multiplied by a constant K3 at step 170. The result is put through a unit delay at 174 to produce K3 Vin-1. Initially Vin is put through a magnitude check at step 172. If the magnitude is greater than a preselected maximum value, the Vin is set to the Vmax and exists to pulse shapers 76 and 78 as Vout. If not, if passes to the pulse shapers 76 and 78 as Vout. Vout also loops back and is multiplied by constant K2 at step 176 and put through a unit delay at 178 to become Vout-1. K3Vin is then added to Vout-1 and subtracted from K3Vin-1. The result is again checked for magnitude at step 172 and passed out as Vout.

Filters 76 and 78 (shown in FIG. 1) are used for gain adjustments to keep the returns in a linear region for analysis. The filters shape the pulses and pass the shaped pulses to comparators 86 and 88, respectively. Hi and low references 80 are put into the comparators. A transmit pulse is obtained (+) signal when the transmit pulse is larger than the high reference. A bottom tank pulse is obtained when the signal is lower than the low reference. The time between the two values is proportional to the amount of fuel in the tank. The more fuel, the larger the time separation will be.

Algorithm filter 92 (also shown in FIG. 1) is used to calculate the propagation time and determine the dielectric constant, the temperature and height and weight of the fluid, which is a function of the fluid. The range of these parameters is then used to determine if any harmful contaminates are present.

Figure 4B:
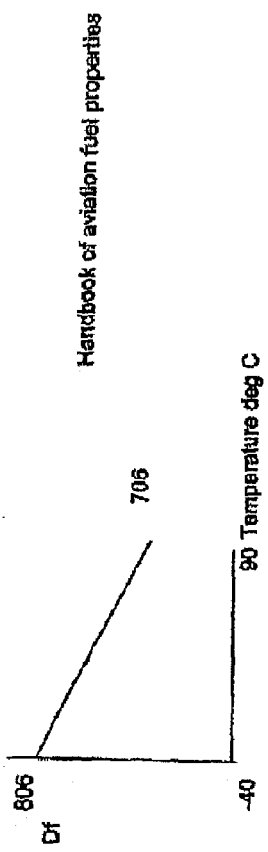
FIG. 4b shows measured receiver data and results calculated there from according one embodiment of the invention.

FIG. 4A shows the calculations necessary to convert the signals into measurements of the height, weight and temperature of the fluid being monitored. Measured receiver data and the results calculated thereof are shown in FIG. 4B.

Figure 5:
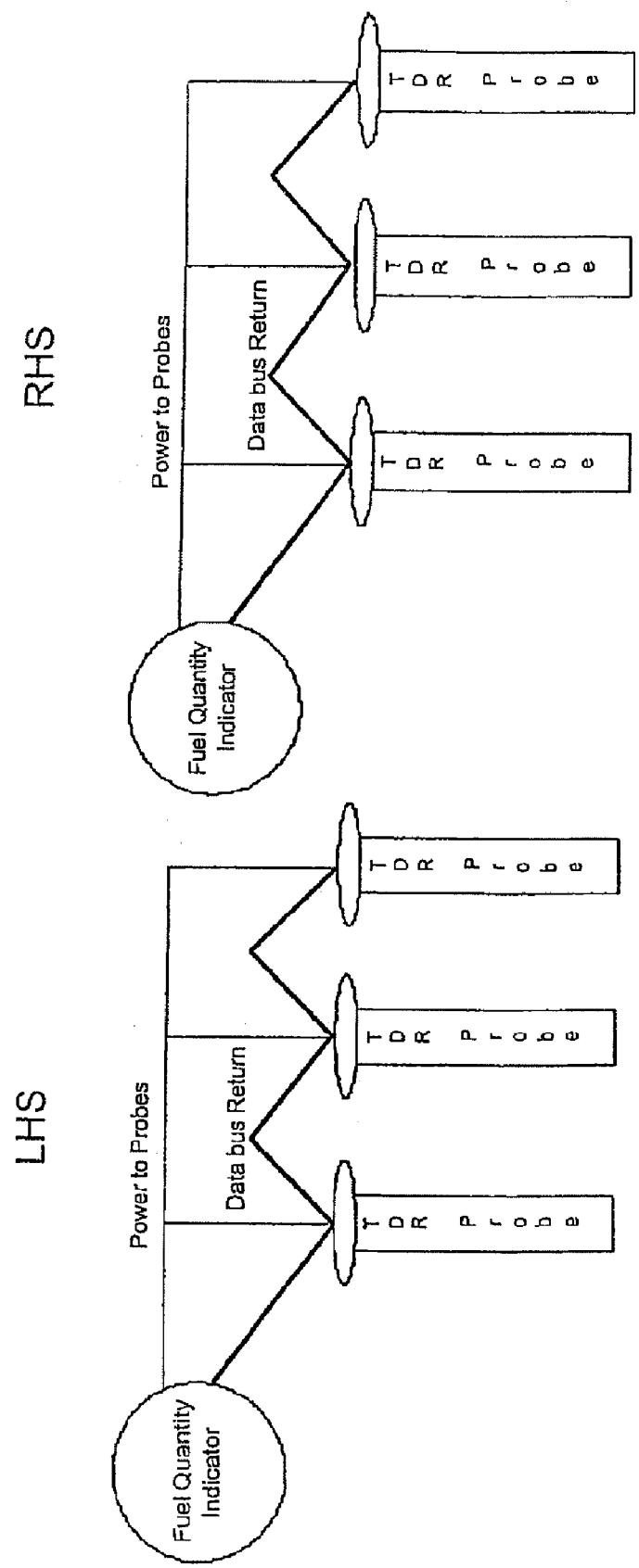
FIG. 5 is shows a series of coaxial probes attached to a central processing unit.

Referring to FIG. 5, a series of TDR fuel probes can be used to monitor fuel levels in one or more fuel tanks found in a conventional aircraft wing. In one embodiment as shown, two independent systems having a plurality of probes connected to independent power sources and independent fuel quantity indicators are used to monitor fuel levels in separate fuel tanks such as left and right fuel tanks positioned in left and right wings, respectively, of a conventional aircraft.

Figure 6:
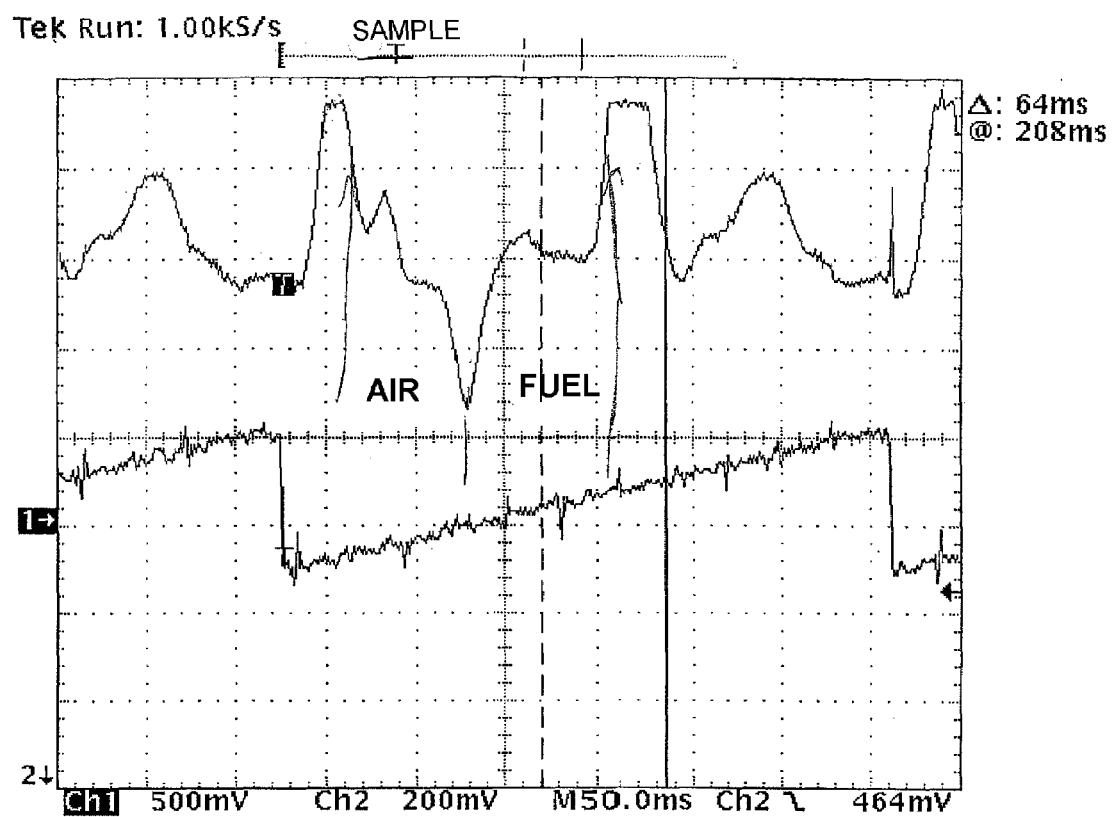
FIG. 6 is a graphical representation/plot of a recorded pulse showing the presence of air and fuel in a fuel tank half full with fuel.
Figure 7:
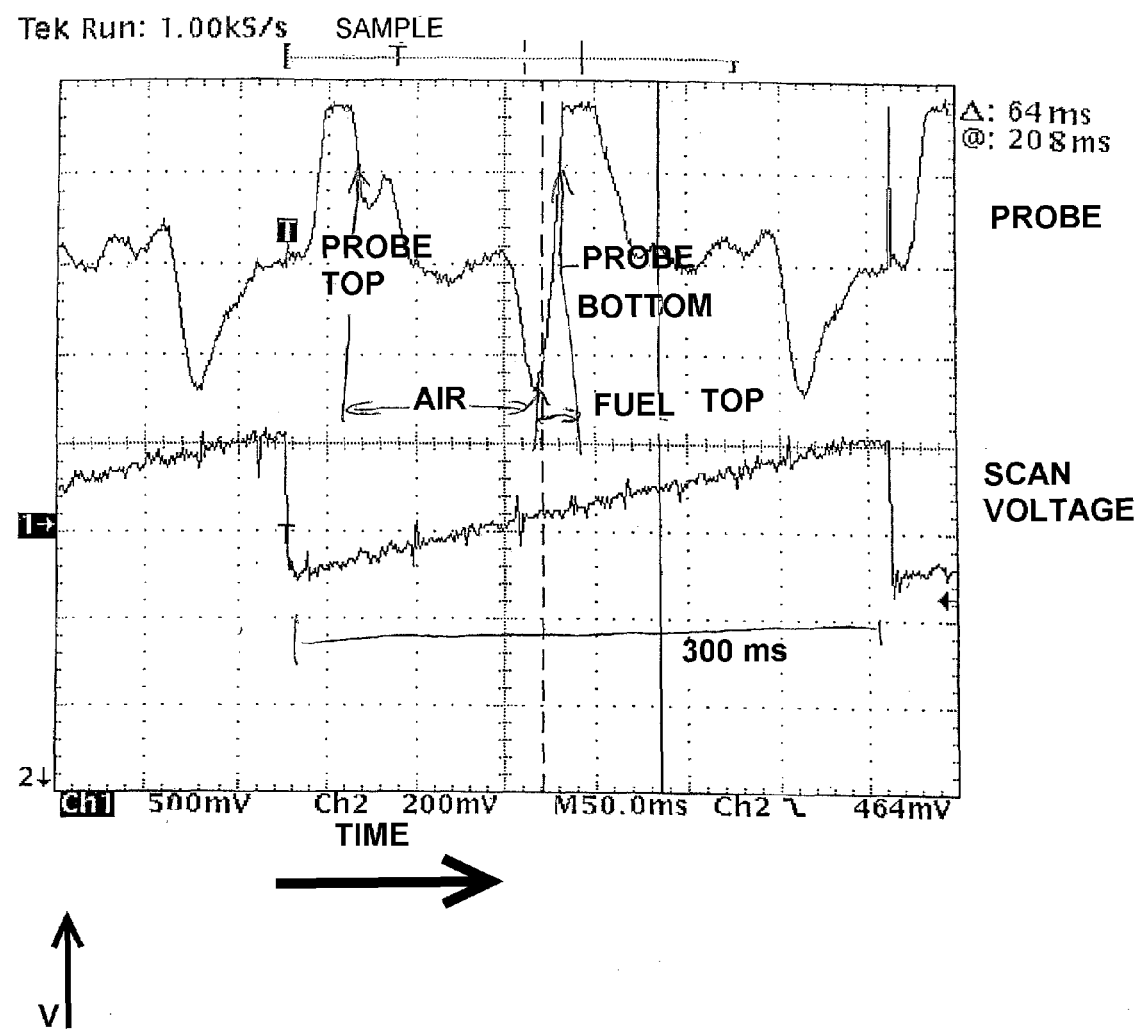
FIG. 7 is a graphical representation/plot of a recorded pulse showing the presence of air in an empty fuel tank.

Referring now to FIGS. 6 and 7, plots are shown of readings taken from tanks with the novel coaxial probe system. FIG. 6 shows readings taken from a tank half full with fuel. The points on the plot representing the air component and fuel or fluid component of the tank are labeled for clarity. For illustrative purposes, FIG. 7 is provided to show readings taken from the same tank when essentially empty.

While the present invention has been described in connection with several embodiments thereof, it will be apparent to those skilled in the art that many changes and modifications may be made without departing from the true spirit and scope of the present invention. Accordingly, it is intended by the appended claims to cover all such changes and modifications as come within the true spirit and scope of the invention.

What we claim as new and desire to secure by United States Letters Patent is:

1. A liquid level sensing apparatus, comprising:
    a coaxial probe;
    a transceiver for generating and receiving electrical pulses, connected to the probe; and
    a digital signal processor connected to the transceiver to process electrical pulses,
    wherein the transceiver and digital signal processor form scan, lock, and track closed loops, and
    wherein the digital signal processor comprises a receiver gate control to control receiver gate operation.

2. The apparatus of claim 1, wherein a transmitter portion of the transceiver includes a delay to delay transmit line electrical pulses.

3. The apparatus of claim 2 further comprising a transistor and capacitor to permit transmission of falling edges of the transmit line electrical pulses and to prevent transmission of rising edges of electrical pulses to the probe.

4. The apparatus of claim 1, wherein the transceiver includes a charge pump for moderating the frequency of the electrical pulses.

5. The apparatus of claim 1, wherein the digital signal processor includes a crystal-based clock for generating electrical pulses.

6. The apparatus of claim 5, wherein the transceiver includes at least one low pass filter for filtering pulses generated by the clock.

7. The apparatus of claim 6, wherein the transceiver comprises a receiver switch and a comparator to control the receiver switch.

8. The apparatus of claim 1, wherein the digital signal processor further comprises an integrate and limit algorithm to control intervals between receiver gate opening events.

9. The apparatus of claim 8, wherein the digital signal processor further comprises a low pass/high pass filter algorithm to refine and clarify shapes of electrical pulses.

10. A method of scanning, locking, and tracking electrical impulses to determine fluid levels in a container comprising the steps of:
    providing a transceiver including a receiver switch connected to a coaxial probe positioned in the container, wherein the transceiver transmits electrical pulses guided by the probe into the container and receives electrical pulses reflected back from the container and guided by the probe;
    providing a DSP comprising a clock connected to the transceiver for generating electrical pulses and a receiver gate control for generating voltage command signals;
    generating an electrical pulse and transmitting to the probe into the container;
    generating and transmitting a control voltage from the DSP;
    controlling operation of the receiver switch with the control voltage;
    comparing the control voltage with the transmitted electrical pulses to determine a time differential between the transmit pulses and receiver gate operation;
    producing a dc output to represent the time differential;
    detecting an electrical pulse reflected back from the container; and,
    processing the reflected pulse to determine fluid level.

11. The method of claim 10 further comprising:
    converting the dc output to a digitized signal;
    summing the digitized signal with a digitized voltage command signal from the receiver gate control to produce a voltage input.

12. The method of claim 10 further comprising multiplying the voltage input by a constant K1 to produce a voltage output.

13. The method of claim 12 further comprising adding the voltage output to an immediately preceding voltage output to produce a final voltage output.

14. The method of claim 13 further comprising delaying the immediately preceding voltage output before adding to the voltage output.

15. The method of claim 14 further comprising checking the final voltage output magnitude against a pre-selected voltage limit and adjusting the final voltage output to the voltage limit if above the limit.

16. The method of claim 15 further comprising transmitting the final voltage output to set the width in a pulse width modulator in the DSP, which produces a pwm output.

17. The method of claim 16 further comprising controlling the receiver gate switch with the pwm output.

18. The method of claim 10 further comprising converting the reflected pulse to a digitized signal.

19. The method of claim 18 further comprising refining and clarifying the digitized signal with low pass/high pass filters.

20. The method of claim 19 further comprising multiplying the digitized signal by constant K3 to produce a reflected pulse voltage input.

21. The method of claim 20 further comprising adding the reflected pulse voltage output to an immediately preceding reflected pulse voltage output to product a final reflected pulse voltage output.

22. The method of claim 21 further comprising delaying the immediately preceding reflected pulse voltage output before adding to the reflected pulse voltage output.

23. The method of claim 22 further comprising checking a final reflected pulse voltage output magnitude against a pre-selected reflected pulse voltage limit and adjusting the final reflected pulse voltage output to the reflected pulse voltage limit if above the limit.

24. The method of claim 23 further comprising transmitting the final reflected pulse voltage output to a transmit pulse shaper to produce a shaped transmit pulse.

25. The method of claim 24 further comprising comparing the shaped transmit pulse to a reference signal, if higher than the reference signal, the shaped transmit pulse is processed to determine a fluid level.

26. The method of claim 23 further comprising transmitting the final reflected pulse voltage output to a fluid level and bottom pulse shaper to produce a shaped fluid level and bottom pulse shaper.

27. The method of claim 26 further comprising comparing the shaped fluid level and bottom pulse shaper to a fluid level reference signal, if lower than the fluid level reference signal, the shaped fluid level and bottom pulse is processed to determine fluid level.

28. The method of claim 27 further comprising transmitting the calculated fluid level to a user interface.

* * * * *